US006963371B2

(12) United States Patent
Sakurai et al.

(10) Patent No.: US 6,963,371 B2
(45) Date of Patent: Nov. 8, 2005

(54) IMAGE PICKUP APPARATUS INCLUDING A PLURALITY OF PIXELS, EACH HAVING A PHOTOELECTRIC CONVERSION ELEMENT AND AN AMPLIFIER WHOSE OUTPUT IS PREVENTED FROM FALLING BELOW A PREDETERMINED LEVEL

(75) Inventors: Katsuhito Sakurai, Machida (JP); Toru Koizumi, Yokohama (JP); Fumihiro Inui, Yokohama (JP); Hiroki Hiyama, Zama (JP); Masaru Fujimura, Astugi (JP); Tomoko Eguchi, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 09/783,556

(22) Filed: Feb. 15, 2001

(65) Prior Publication Data

US 2003/0206234 A1 Nov. 6, 2003

(30) Foreign Application Priority Data

Feb. 18, 2000 (JP) ........................................ 2000-041295

(51) Int. Cl.$^7$ ............................................. H04N 5/335
(52) U.S. Cl. ........................ 348/301; 348/308; 348/241; 257/223
(58) Field of Search ................................. 348/301, 308, 348/241, 302, 300; 257/223

(56) References Cited

U.S. PATENT DOCUMENTS

| | | | | |
|---|---|---|---|---|
| 5,793,423 A | * | 8/1998 | Hamasaki | .................... 348/302 |
| 6,677,993 B1 | * | 1/2004 | Suzuki et al. | ................ 348/241 |
| 6,784,931 B1 | * | 8/2004 | Kudo | .......................... 348/296 |
| 2001/0033337 A1 | * | 10/2001 | Sakuragi | ..................... 348/302 |

* cited by examiner

Primary Examiner—Wendy R. Garber
Assistant Examiner—Gary C. Vieaux
(74) Attorney, Agent, or Firm—Fitzpatrick, Cella, Harper & Scinto

(57) ABSTRACT

The output voltages of dark pixels and optical black (OB) pixels are different between a row including a pixel which receives strong light and another row. An image formed upon receiving a strong light spot suffers whitish bands on the right and left of the spot. To solve this problem, this invention provides an image pickup apparatus including a pixel containing a photodiode which converts a photo-signal into a signal charge and accumulates the signal charge and an amplifier transistor which amplifies the signal charge accumulated in the photodiode, and a control element adapted to limit the output of the amplifier transistor so as to prevent the output from falling to below a determined voltage.

12 Claims, 8 Drawing Sheets

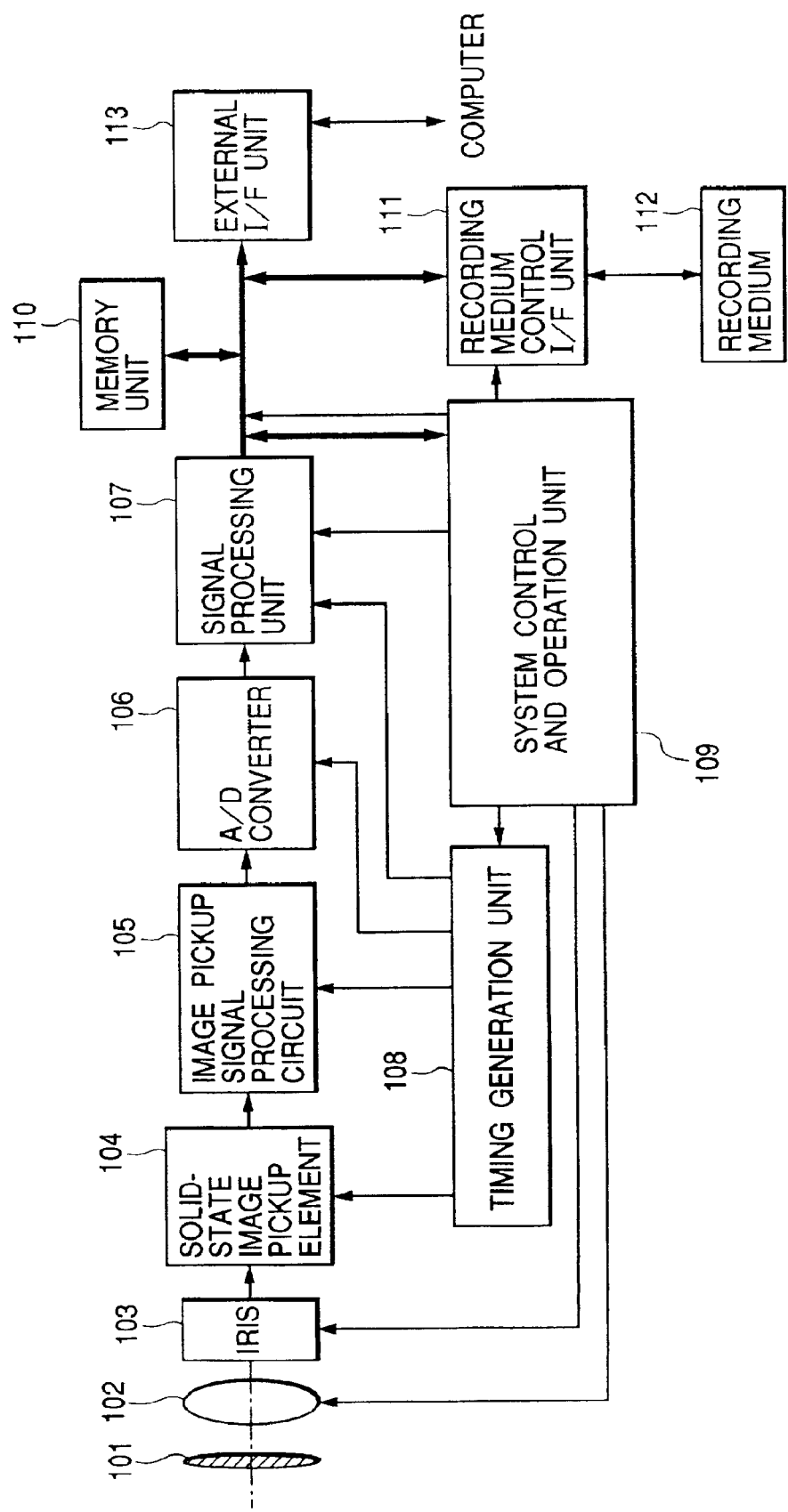

IMAGE PICKUP APPARATUS INCLUDING A PLURALITY OF PIXELS, EACH HAVING A PHOTOELECTRIC CONVERSION ELEMENT AND AN AMPLIFIER WHOSE OUTPUT IS PREVENTED FROM FALLING BELOW A PREDETERMINED LEVEL

BACKGROUND OF THE INVENTION

1. Field of the Invention

The present invention relates to a solid-state image pickup device widely used in image pickup apparatuses such as a video camera and a digital still camera.

2. Related Background Art

In recent years, the pixel size has enthusiastically been reduced using a miniaturization process for the purpose of high resolution. Since this decreases the photoelectrically converted signal output, amplifier type solid-state image pickup devices capable of amplifying and outputting a photoelectrically converted signal are receiving a great deal of attention. Such amplifier type solid-state image pickup device includes a MOS, AMI, CMD, and BASIS type device. Of these devices, the MOS type solid-state image pickup device accumulates photocarriers generated by a photodiode in the gate electrode of a MOS transistor, and amplifies the electric charges to output the potential change to an output unit in accordance with a driving timing from a scanning circuit. Of the MOS type solid-state image pickup devices, attention recently has been given particularly to a CMOS solid-state image pickup device in which all the components including a photoelectric conversion unit and peripheral circuit are implemented by a CMOS process.

FIG. 1 is a block diagram showing the arrangement of a conventional CMOS solid-state image pickup device. In FIG. 1, the CMOS solid-state image pickup device comprises a pixel portion 1, and a vertical scanning circuit unit 2 for vertically scanning pixels. The pixel portion 1 is constituted by photodiodes D11 to D33, reset MOS transistors (to be referred to as MOSs) M211 to M233 for resetting electric charges in the photodiodes, amplifier MOSs M311 to M333 for amplifying electric charges in the photodiodes, selector MOSs M411 to M433 for selecting rows, and vertical output lines V1 to V3. Load MOSs M51 to M53 serve as the loads of the amplifier MOSs, an input MOS M50 sets a constant current to be supplied to the load MOSs, and a voltage input terminal 5 sets the gate voltage of the input MOS.

The operation of the solid-state image pickup device in FIG. 1 will be described. When light is incident on the photodiodes D11 to D33, the respective photodiodes generate and accumulate photo-signal charges. In reading out signals, they are sequentially read out to the vertical output lines V1 to V3 in units of rows while the vertical scanning circuit unit 2 vertically scans the pixels. If the first row is selected, a signal on a second row selection line PSEL1 connected to the gates of the selector MOSs M411, M421, and M431 changes to high level, and the amplifier MOSs M311, M321, and M331 are activated. As a result, signals on the first row are read out to the vertical output lines V1 to V3. Then, a signal on a first row selection line PRES1 connected to the gates of the reset MOSs M211, M221, and M231 changes to high level, and the electric charges accumulated in the photodiodes D11, D21, and D31 are reset. The second row is selected, and signals on the second row are similarly read out to the vertical output lines V1 to V3. Similarly, signals on the third and subsequent lines are sequentially read out to the vertical output lines V1 to V3.

In a read-out operation in the solid-state image pickup device of FIG. 1, as a photo-signal is higher, the voltages on the vertical output lines V1 to V3 are lower. The vertical output lines V1 to V3 are respectively connected to the drains of the load MOSs M51 to M53. On a column from which the signal of a pixel receiving very strong light is read out, the source-drain voltage of a load MOS drops to 0 V to turn it off. Hence, a current which flows through a common GND line 4 in reading out a given row changes depending on the number of load MOSs which are in an off-state (referred to hereinafter as "OFF load MOSs"). The line width of the GND line 4 can take only a finite value in terms of limitations on the chip size or the like, and has a certain impedance.

The value of a constant current which is supplied to the load MOS is set to apply the voltage of the input terminal 5 between the gate of the input MOS M50 and an absolute GND (e.g., ground potential of an external substrate). For this reason, the set current value changes owing to a voltage drop determined by the impedance of the GND line 4 and the current flowing therethrough. Since the number of OFF load MOSs is larger as the number of pixels receiving strong light is larger, the voltage drop across the GND line 4 decreases to increase the set current of the load MOS, resulting in a large gate-source voltage of the amplifier MOS. Due to this phenomenon, the output voltages of dark pixels and optical black (OB) pixels are different between a row including a pixel receiving strong light and another row. An image receiving a strong light spot suffers whitish bands on the right and left of the spot.

SUMMARY OF THE INVENTION

It is an object of the present invention to provide an image pickup apparatus capable of obtaining a clear image.

To achieve the above object, according to an aspect of the present invention, there is provided an image pickup apparatus comprising:

a plurality of pixels, each of the pixels including a photoelectric conversion element adapted to perform photoelectric conversion and an amplifier element adapted to amplify and output a signal from the photoelectric conversion element; and a control element adapted to limit an output level of the amplifier element so that the output level is prevented from falling to below a predetermined level.

According to another aspect of the present invention, there is provided an image pickup apparatus comprising:

a plurality of pixels, each of the pixels including a photoelectric conversion element adapted to perform photoelectric conversion and an amplifier element adapted to amplify and output a signal from the photoelectric conversion element;

a load element adapted to serve as a load of the amplifier element; and a control element adapted to control to prevent the load element from being turned off regardless of quantity of signal generated by the photoelectric conversion element.

BRIEF DESCRIPTION OF THE DRAWINGS

FIG. 9 is a block diagram schematically illustrating a camera (image pickup apparatus) utilizing a solid state image pickup device according to any one of the first to the eighth embodiment of the present invention.

DETAILED DESCRIPTION OF THE PREFERRED EMBODIMENTS

Preferred embodiments of the present invention will be described in detail below with reference to the accompanying drawings. In the following embodiments, circuit elements constituting a solid-state image pickup device are formed on one semiconductor substrate of single-crystal silicon by a semiconductor integrated circuit manufacturing technique (e.g., CMOS process), but the present invention is not limited to this. In the following embodiments, a 3×3 pixel array is adopted for descriptive convenience, but the present invention is not limited to this. In the following embodiments, a MOS transistor will be simply referred to as a MOS.

Figure 1:
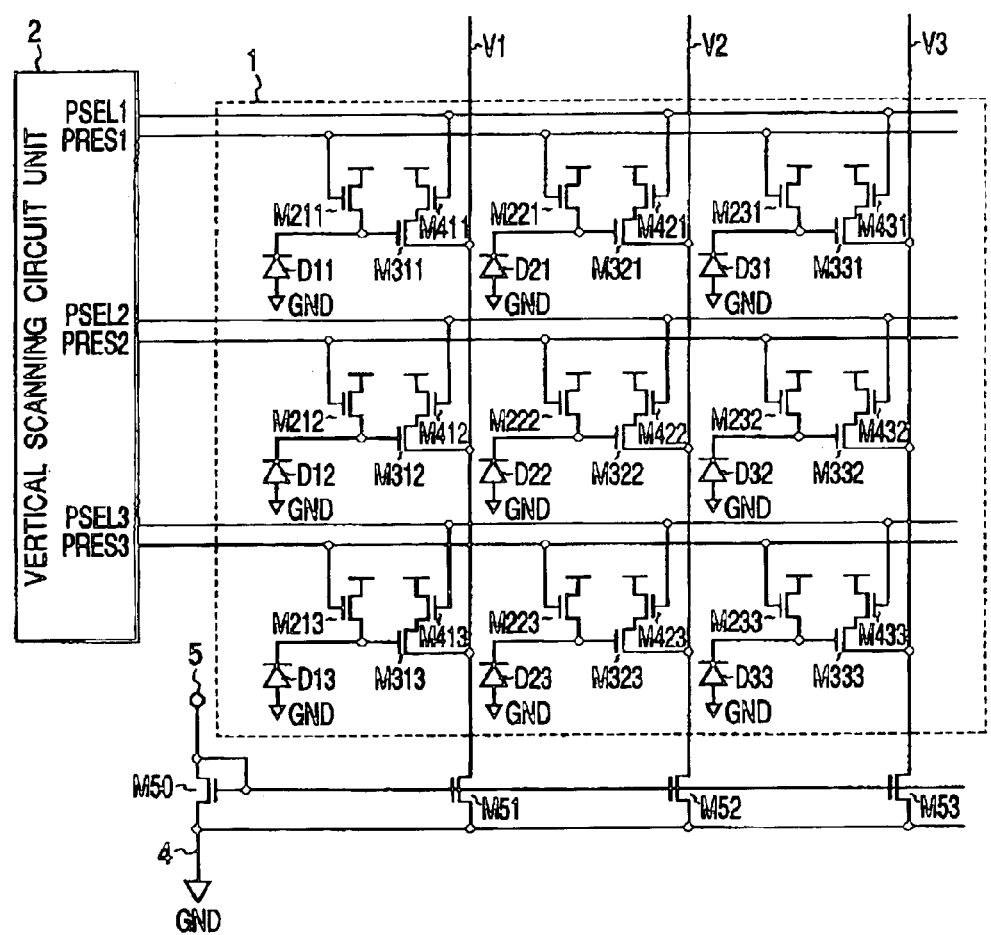
FIG. 1 is a block diagram showing a conventional solid-state image pickup device.
Figure 2:
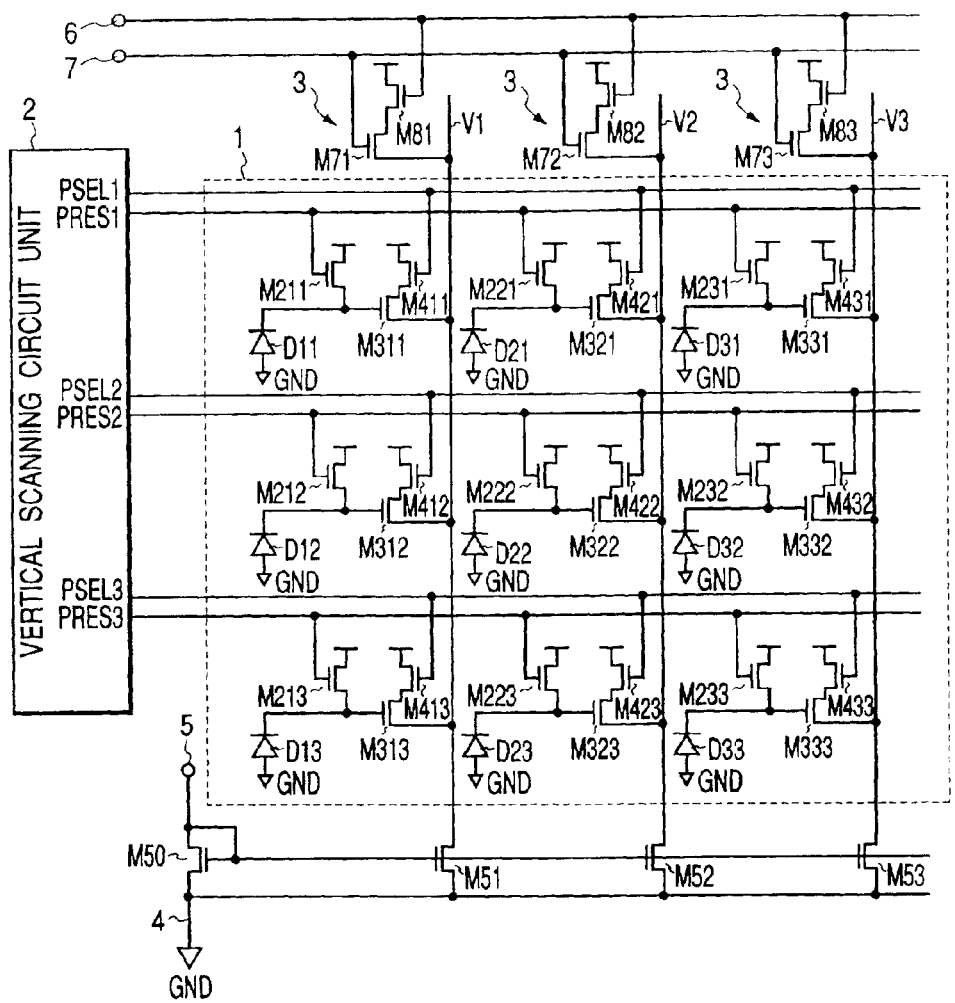
FIG. 2 is a block diagram showing the first embodiment of the present invention.

FIG. 2 is a block diagram showing a solid-state image pickup device according to the first embodiment of the present invention. In FIG. 2, the same reference numerals as in the conventional element of FIG. 1 denote the same parts. That is, the solid-state image pickup device comprises a pixel portion 1, vertical scanning circuit unit 2, and GND line 4, which are identical to those in FIG. 1. Clipping element 3 clips vertical output lines, which will be described later. The pixel portion 1 will be explained. In this embodiment, the anodes of photodiodes D11 to D33 for generating photo-signal charges are grounded, and their cathodes are connected to the gates of amplifier MOSs M311 to M333. The gates of the amplifier MOSs M311 to M333 are connected to the sources of reset MOSs M211 to M233 for resetting the gates, and the drains of which are connected to a reset power supply. The drains of the amplifier MOSs M311 to M333 are connected to selector MOSs M411 to M433 for supplying a power supply voltage.

The gate of the reset MOS M211 is connected to a first row selection line (vertical scanning line) PRES1 which runs in the lateral direction. The gates of the reset MOSs M221 and M231 of the remaining pixel cells on the same row are also commonly connected to the first row selection line PRES1. The gate of the selector MOS M411 is connected to a second row selection line (vertical scanning line) PSEL1 which runs in the lateral direction. The gates of the selector MOSs M421 and M431 of the remaining pixel cells on the same row are also commonly connected to the second row selection line PSEL1. The first and second row selection lines are connected to the vertical scanning circuit unit 2, and receive signal voltages based on operation timings (to be described later).

On the remaining rows in FIG. 2, pixel cells having the same arrangement, and row selection lines are laid out. These row selection lines receive signals on row selection lines PRES2, PRES3, PSEL2, and PSEL3 from the vertical scanning circuit unit 2. The source of the amplifier MOS M311 is connected to a vertical output line V1 which runs in the longitudinal direction. The sources of the amplifier MOSs M312 and M313 of pixel cells on the same column are also connected to the vertical output line V1. The vertical output line V1 is connected to a load MOS M51 serving as a load element, and also to a corresponding clipping element 3 for clipping the vertical output line V1.

The clipping element 3 is made up of a clipping MOS M71, and a MOS M81 for activating clipping operation. The source of the MOS M71 is connected to the vertical output line V1. The drain of the MOS M71 is connected to the power supply via the MOS M81, and its gate is connected to a power supply line 7 for setting a clipping voltage. The gate of the MOS M81 is connected to a control pulse line 6 for controlling clipping operation. Remaining vertical output lines V2 and V3 in FIG. 1 are similarly connected to the amplifier MOSs, load MOSs, and clipping element 3. The sources of the load MOSs M51 to M53 are connected to the common GND line 4, and their gates are connected to the gate of the input MOS M50 and a voltage input terminal 5.

The operation of the first embodiment will be explained. When light is incident on the photodiodes D11 to D33, the respective photodiode generate and accumulate photo-signal charges. In reading out signals, they are sequentially read out to the vertical output lines V1 to V3 in units of rows while the vertical scanning circuit unit 2 vertically scans the pixels. If the first row is selected, the second row selection line PSEL1 connected to the gates of the selector MOSs M411, M421, and M431 changes to high level, and the amplifier MOSs M311, M321, and M331 are activated. At the same time, a signal on the control pulse line 6 for driving the clipping element 3 also changes to high level, and clipping MOSs M71 to M73 are also activated. As a result, signals on the first row are read out to the vertical output lines V1 to V3. Then, the first row selection line PRES1 connected to the gates of the reset MOSs M211, M221, and M231 changes to high level, and electric charges accumulated in the photodiodes D11, D21, and D31 are reset. The second row is selected, and signals on the second row are similarly read out to the vertical output lines V1 to V3. Similarly, signals on the third and subsequent lines are sequentially read out to the vertical output lines V1 to V3.

While, e.g., signals on the first row are read out in this operation, the sources of the amplifier MOS M311 and clipping MOS M71, those of the amplifier MOS M321 and clipping MOS M72, and those of the amplifier MOS M331 and clipping MOS M73 are commonly connected to each form a differential arrangement. For example, when the gate voltage of the amplifier MOS M311 is much higher than a set clipping voltage 7, the clipping MOS M71 is OFF, and thus a signal voltage read out to the vertical output line V1 is a voltage based on the signal voltage of the gate of the amplifier MOS M311. If the gate voltage of the amplifier MOS M311 comes close to the set clipping voltage 7, the clipping MOS M71 is turned on to activate clipping operation, thereby starting clipping effect. When the gate voltage of the amplifier MOS M311 is much lower than the set clipping voltage 7, the vertical output line V1 does not decrease below a voltage determined by the set clipping voltage 7 or less.

This also applies to the remaining vertical output lines V2 and V3 in FIG. 2. The clipping voltage 7 is set such that the voltages of the vertical output lines V1 to V3 do not drop below a drain voltage for operating the load MOSs M51 to M53 within the saturation range. This setting can prevent the load MOSs M51 to M53 from being turned off even in case of reading out very high signal charges. The voltage drop across the GND line 4 remains the same regardless of the number of pixels which receive strong light, so the set currents of the load MOSs M51 to M53 stay constant regardless of read from any row. In the first embodiment, the output voltages of dark pixels and OB pixels are equal between a row including a pixel receiving strong light and another row. Thus, an image receiving a strong light spot is free from any whitish band, and a clear image can be obtained.

Figure 3:
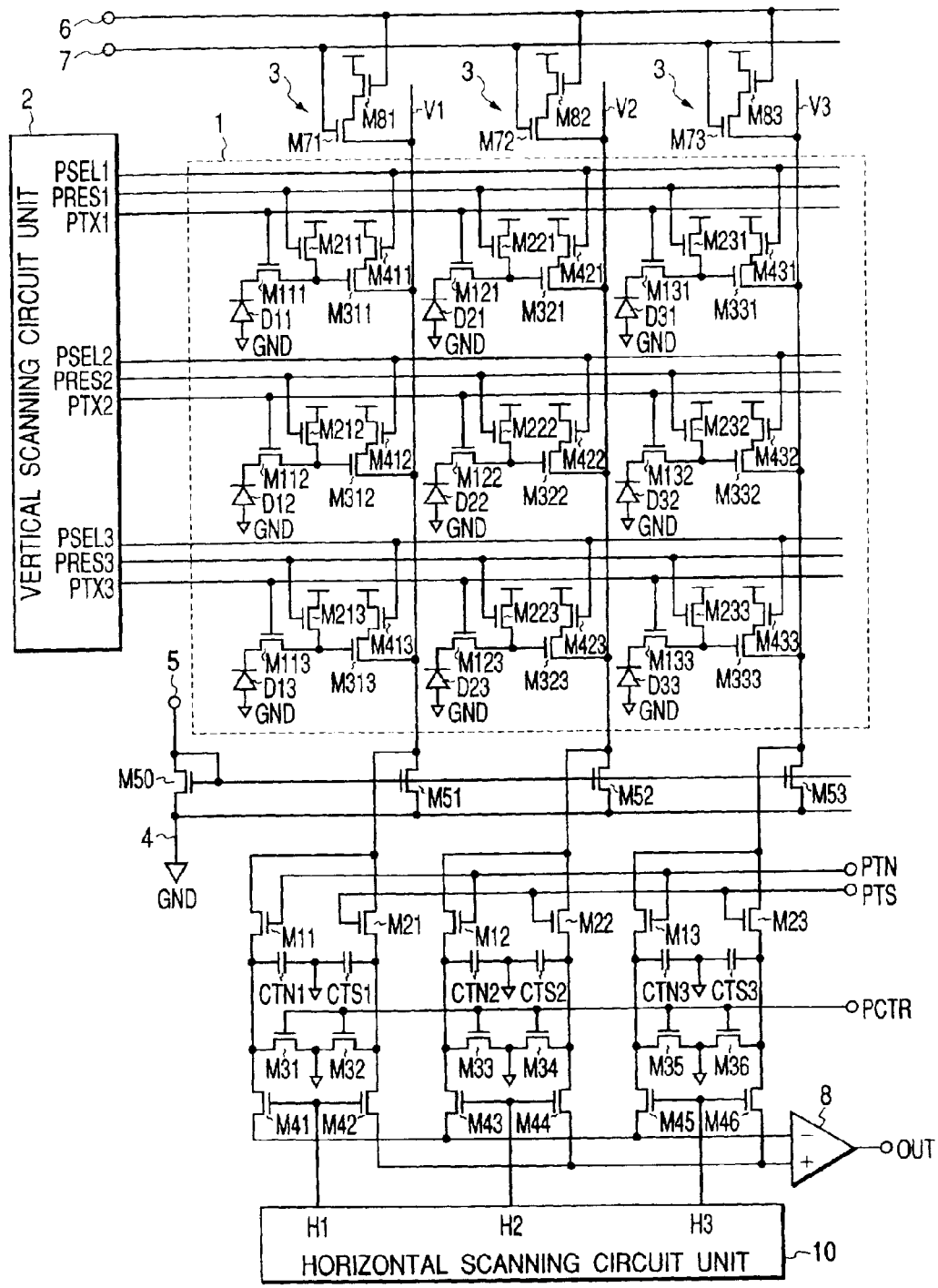
FIG. 3 is a block diagram showing the second embodiment of the present invention.

FIG. 3 is a block diagram showing a solid-state image pickup device according to the second embodiment of the present invention. The second embodiment is different from the first embodiment in that a pixel portion 1 additionally comprises transfer MOSs M111 to M133 for transferring photo-signal charges accumulated in photodiodes, between the cathodes of photodiodes D11 and D33 and the gates of amplifier MOSs M311 to M333. The gate of the amplifier MOS M311 is connected to a third row selection line (vertical scanning line) PTX1 which runs in the lateral direction. The gates of the transfer MOSs M121 and M131 of the remaining pixel cells on the same row are also commonly connected to the third row selection line PTX1. Similar to the first and second row selection lines, the third row selection line is also connected to a vertical scanning circuit unit 2, and receives a signal voltage based on an operation timing (to be described later). The remaining arrangement of the pixel portion is the same as in FIG. 1, and the same reference numerals denote the same parts.

A vertical signal line V1 is simultaneously connected to a capacitance CTN1 for temporarily holding a noise signal via a noise signal transfer switch M11, and to a capacitance CTS1 for temporarily holding a photo-signal via a photo-signal transfer switch M21. The opposite terminals of the noise signal holding capacitance CTN1 and photo-signal holding capacitance CTS1 are grounded. The node between the noise signal transfer switch M11 and the noise signal holding capacitance CTN1, and the node between the photo-signal transfer switch M21 and the photo-signal holding capacitance CTS1 are respectively grounded via holding capacitance reset switches M31 and M32, and connected via horizontal transfer switches M41 and M42 to a differential circuit block 8 for calculating the difference between a photo-signal and a noise signal.

The gates of the horizontal transfer switches M41 and M42 are commonly connected to a column selection line H1 and horizontal scanning circuit unit 10. Similar read circuits are arranged in remaining columns V2 and V3 in FIG. 3. The gates of noise signal transfer switches M11 to M13 connected to respective columns, and those of photo-signal transfer switches M21 to M23 are commonly connected to PTN and PTS, respectively, and receive signal voltages according to operation timings (to be described later).

The operation of the second embodiment will be described. A first row selection line PRES1 connected to the gates of reset MOSs M211, M221, and M231 changes to high level prior to read of photo-signal charges from the photodiodes D11 to D33. Then, the gates of the amplifier MOSs M311, M321, and M331 are reset to a reset power supply. After the first row selection line PRES1 connected to the gates of the reset MOSs M211, M221, and M231 returns to low level, a second row selection line PSEL1 connected to the gates of selector MOSs M411, M421, and M431, a control pulse on a control pulse line 6 connected to clipping element 3, and PTN connected to the gates of the noise signal transfer switches M11 to M13 change to high level. Accordingly, reset signals (noise signals) on which reset noise is superposed are read out to noise signal holding capacitances CTN1 to CTN3.

PTN connected to the gates of the noise signal transfer switches M11 to M13 returns to low level. PTX1 connected to the gates of the transfer MOSs M111, M121, and M131 changes to high level, and the photo-signal charges in the photodiodes D11, D21, and D31 are transferred to the gates of the amplifier MOSs M311, M321, and M331. After PTX1 connected to the gates of the transfer MOSs M111, M121, and M131 returns to low level, PTS connected to the gates of the photo-signal transfer switches M21 to M23 changes to high level. Thus, photo-signals are read out to the photo-signal holding capacitances CTS1 to CTS3. Subsequently, PSEL1 connected to the gates of the selector MOSs M411, M421, and M431, the control pulse line 6 connected to the clipping element 3, and PTS connected to the gates of the photo-signal transfer switches M21 to M23 return to low level. By this operation, noise signals and photo-signals in pixel cells connected to the first row are held by the noise signal holding capacitances CTN1 to CTN3 and photo-signal holding capacitances CTS1 to CTS3 connected to respective columns.

The first row selection line PRES1 connected to the gates of the reset MOSs M211, M221, and M231, and PTX1 connected to the gates of the transfer MOSs M111, M121, and M131 change to high level, and the photo-signal charges in the photodiodes D11, D21, and D31 are reset. Thereafter, the gates of horizontal transfer switches M41 to M46 on respective columns sequentially change to high level in accordance with signals H1 to H3 from the horizontal scanning circuit unit 10. The voltages held in the noise holding capacitances CTN1 to CTN3 and photo-signal holding capacitances CTS1 to CTS3 are sequentially read out to the differential circuit block 8. The differential circuit block 8 calculates the differences between photo-signals and noise signals, and sequentially outputs the differences to an output terminal OUT. Then, read of pixel cells connected to the first row is completed. After that, PCTR connected to the gates of reset switches M31 to M36 for the noise signal holding capacitances CTN1 to CTN3 and photo-signal holding capacitances CTS1 to CTS3 changes to high level prior to read of the second row, and is reset to GND. Similarly, signals in pixel cells connected to the second and subsequent rows are sequentially read out in accordance with signals from the vertical scanning circuit unit 2, and read-out of all the pixel cells is completed.

While, e.g., signals on the first row are read out by this operation, the sources of the amplifier MOS M311 and a clipping MOS M71, those of the amplifier MOS M321 and a clipping MOS M72, and those of the amplifier MOS M331 and a clipping MOS M73 are commonly connected to form a differential arrangement. For example, when the gate voltage of the amplifier MOS M311 is much higher than a set clipping voltage 7, the clipping MOS M71 is OFF, and thus a photo-signal voltage read out to the vertical output line V1 is a voltage based on the signal voltage of the gate of the amplifier MOS M311. If the gate voltage of the amplifier MOS M311 comes close to the set clipping voltage 7, the clipping MOS M71 is turned on to activate clipping operation. When the gate voltage of the amplifier MOS M311 is much lower than the set clipping voltage 7, the vertical output line V1 does not decrease below a voltage determined by the set clipping voltage 7 or less.

This also applies to the remaining vertical output lines V2 and V3 in FIG. 3. The clipping voltage 7 is set such that the voltages of the vertical output lines V1 to V3 do not drop below a drain voltage for operating load MOSs M51 to M53 in the saturation range. This setting can prevent the load MOSs M51 to M53 from being turned off even in case of reading out very high signal charges. The voltage drop across a GND line 4 remains the same regardless of the number of pixels which receive strong light, and the set currents of the load MOSs also stay constant regardless of read from any row. Also in the second embodiment, the output voltages of dark pixels and OB pixels are equal between a row including a pixel receiving strong light and another row. Thus, an image receiving a strong light spot is free from any whitish band, and a clear image can be obtained.

Figure 4:
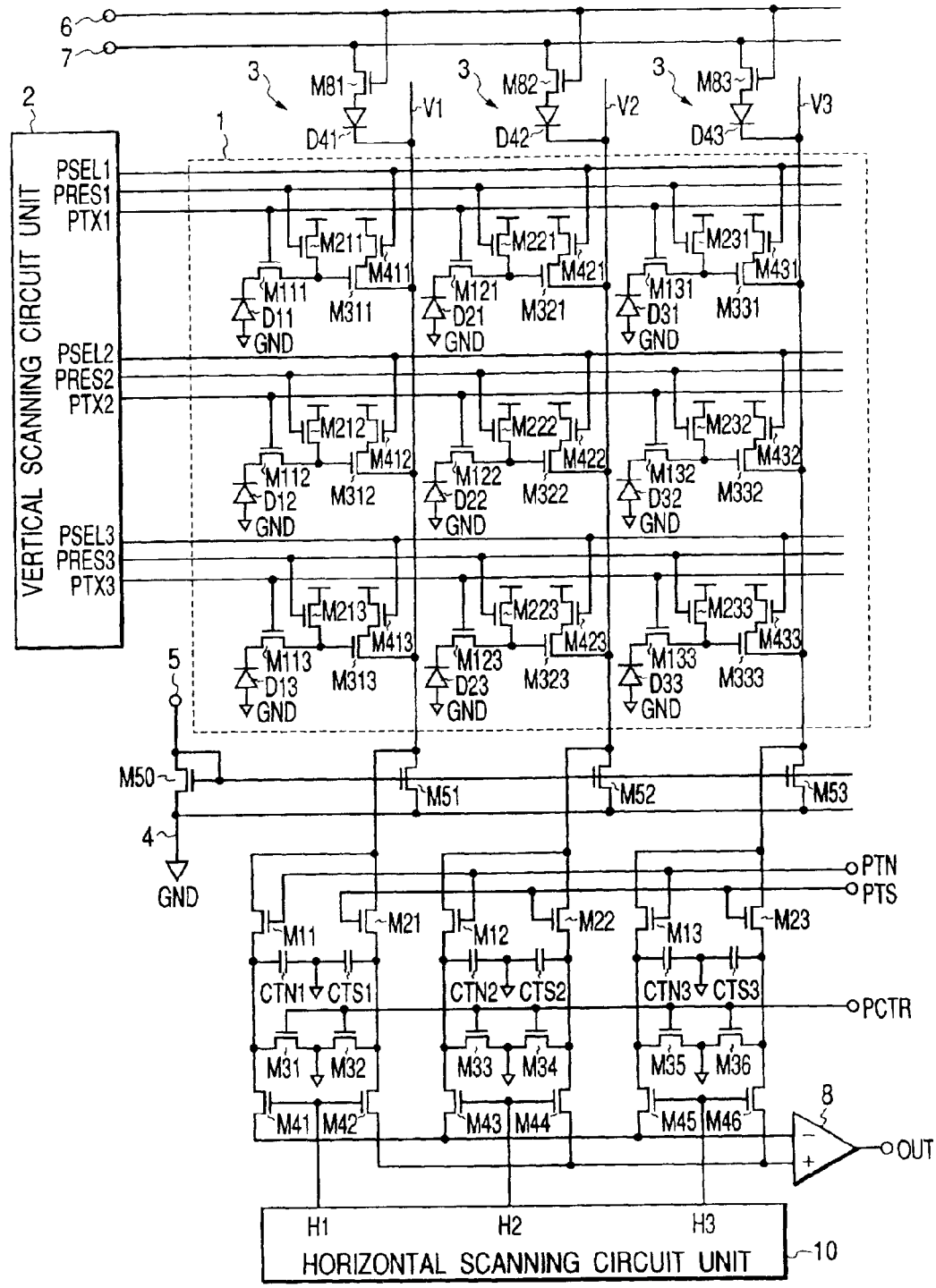
FIG. 4 is a block diagram showing the third embodiment of the present invention.

FIG. 4 is a block diagram showing a solid-state image pickup device according to the third embodiment of the present invention. The third embodiment is the same as the second embodiment except that clipping elements 3 are respectively made up of clipping diodes D41 to D43, and MOSs M81 to M83 for activating clipping operation. The cathodes of the clipping diodes D41 to D43 are respectively connected to vertical output lines V1 to V3, and their anodes are connected via the MOSs M81 to M83 to a power supply line 7 for setting a clipping voltage. The gates of the MOSs M81 to M83 are connected to a control pulse line 6 for controlling clipping operation. The operation of the third embodiment is the same as in FIG. 3. The use of the diodes for the clipping element enables steeper clipping of vertical output lines.

Figure 5:
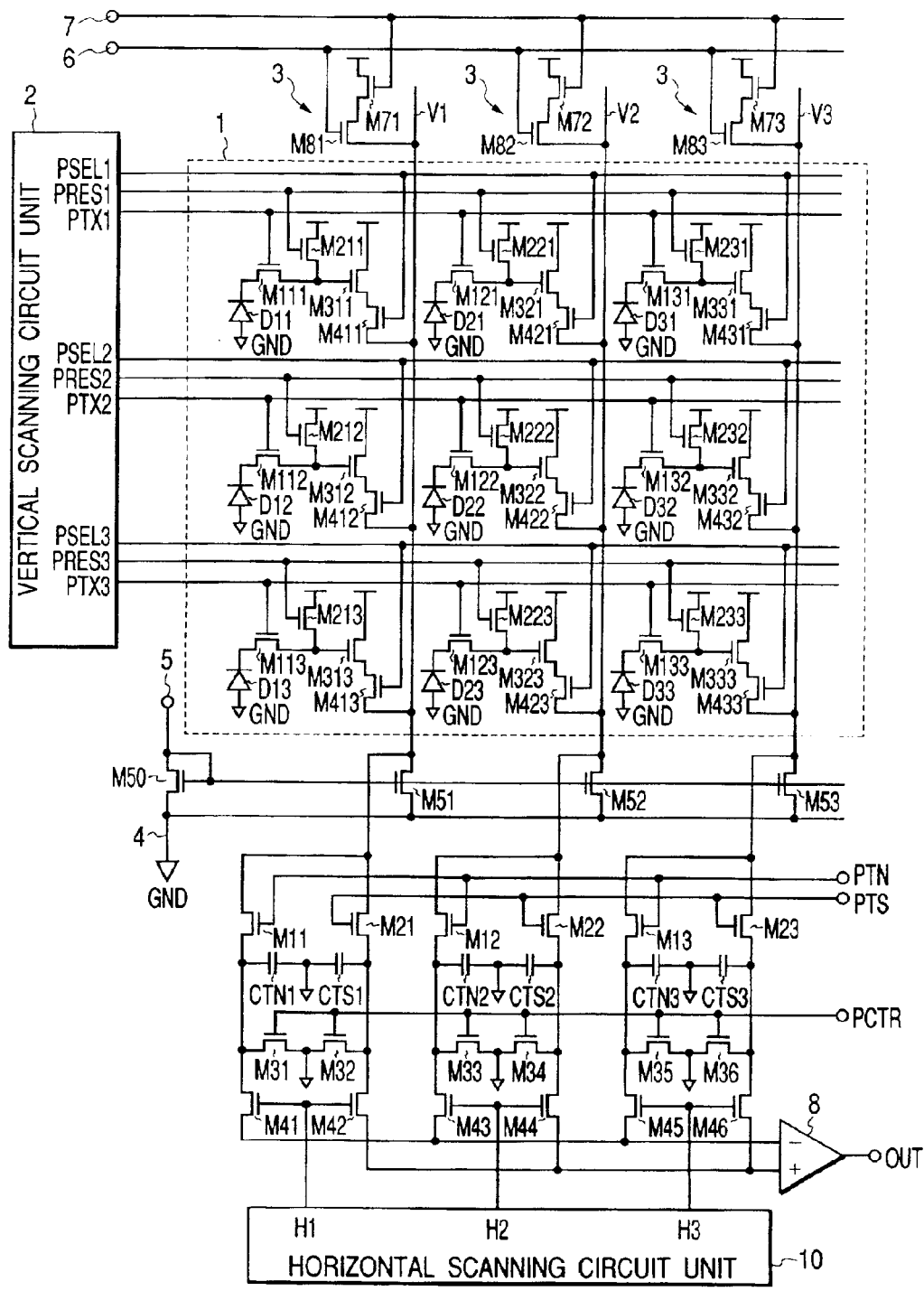
FIG. 5 is a block diagram showing the fourth embodiment of the present invention.

FIG. 5 is a block diagram showing a solid-state image pickup device according to the fourth embodiment of the present invention. The fourth embodiment is different from the second embodiment in the arrangements of a pixel portion 1 and clipping element 3. The drains of amplifier MOSs M311 to M333 are directly connected to the power supply. The source of the amplifier MOS M311 is connected via a selector MOS M411 to a vertical output line V1 which runs in the longitudinal direction. The sources of the amplifier MOSs M312 and M313 of pixel cells on the same column are also connected to the vertical output line V1 via selector MOSs M412 and M413, respectively.

Each clipping element 3 is made up of a clipping MOS M71, and a MOS M81 for activating clipping operation. The source of the MOS M81 is connected to the vertical output line V1. The clipping MOS M71 is directly connected to the power supply, similar to the arrangement of the pixel portion 1, and its gate is connected to a power supply line 7 for setting a clipping voltage. The gate of the MOS M81 is connected to a control pulse line 6 for controlling clipping operation. Amplifier MOSs, selector MOSs, and the clipping element 3 are similarly connected to remaining vertical output lines V2 and V3 shown in FIG. 4. The operation of the fourth embodiment is the same as that of the second embodiment, and a description thereof will be omitted. The fourth embodiment can attain the same effects as those of the second embodiment.

Figure 6:
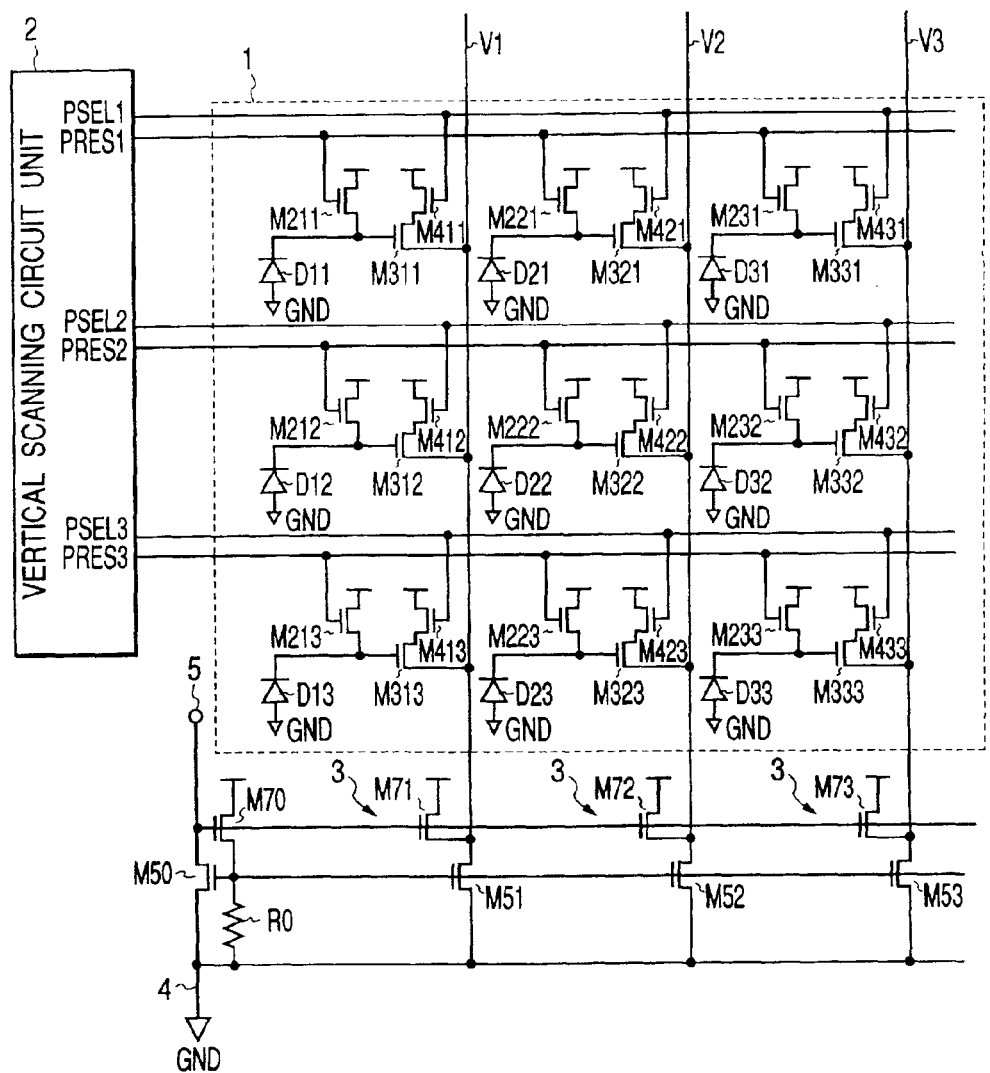
FIG. 6 is a block diagram showing the fifth embodiment of the present invention.

FIG. 6 is a block diagram showing a solid-state image pickup device according to the fifth embodiment of the present invention. The fifth embodiment is different from the first embodiment in the arrangement of clipping element 3. In the fifth embodiment, the clipping elements 3 are respectively formed from clipping MOSs M71 to M73, the sources of which are respectively connected to vertical output lines V1 to V3. The gates of a MOS M70 and the MOSs M71 to M73 are commonly connected to the input terminal 5, and their drains are connected to the power supply.

The operation will be described. Similar to the first embodiment, light is incident on photodiodes D11 to D33, and accumulated photo-signal charges are sequentially read out to the vertical output lines V1 to V3. In the fifth embodiment, for example, when the gate voltage of an amplifier MOS M311 is much higher than the voltage of an input terminal 5, the clipping MOS M71 is OFF, and thus a signal voltage read out to the vertical output line V1 is a voltage based on the signal voltage of the gate of the amplifier MOS M311. If the gate voltage of the amplifier MOS M311 comes close to the voltage of the input terminal 5, the clipping MOS M71 is turned on to activate clipping operation. When the gate voltage of the amplifier MOS M311 is much lower than the voltage of the input terminal 5, the vertical output line V1 does not decrease below a voltage determined by the voltage of the input terminal 5 or less. This also applies to the remaining vertical output lines V2 and V3 shown in FIG. 6. Therefore, the voltages of the vertical output lines V1 to V3 do not drop below a drain voltage for operating load MOSs M51 to M53 in the saturation range. Accordingly, the load MOSs M51 to M53 can be prevented from being turned off even in case of reading out very high signal charges. The fifth embodiment can obtain the same effects as those of the first embodiment. In addition, the fifth embodiment need not set a clipping voltage 7 of the first embodiment independently of the voltage of the input terminal 5.

Figure 7:
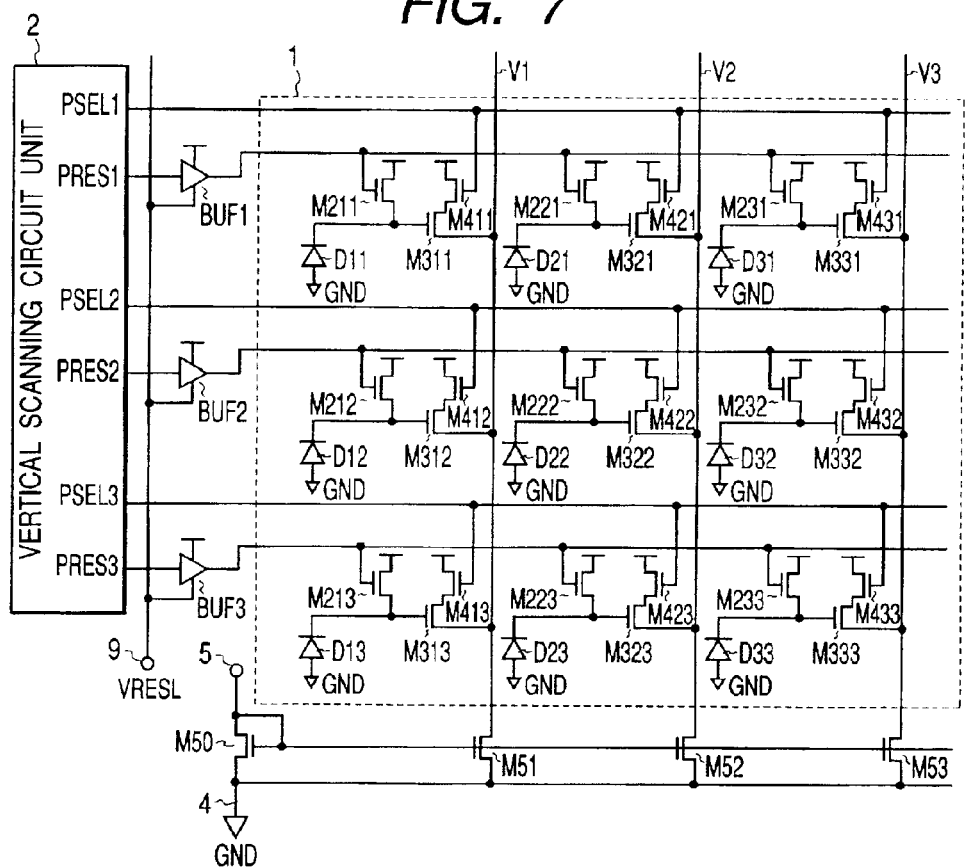
FIG. 7 is a block diagram showing the sixth embodiment of the present invention.

FIG. 7 is a block diagram showing a solid-state image pickup device according to the sixth embodiment of the present invention. In the sixth embodiment, the clipping elements 3 are replaced by an identical function by setting the low-level voltage of a pulse for driving the gates of reset MOSs M211 to M233 from a VRESL terminal 9. In this case, the VRESL terminal 9 is connected to the ground power supply terminals of BUFs (buffers) 1 to 3, and the voltage of the VRESL terminal 9 sets the low-level voltage of the pulse for driving the gates of the reset MOSs.

The operation of the sixth embodiment will be explained. Similar to the first embodiment, light is incident on photodiodes D11 to D33, and accumulated photo-signal charges are sequentially read out to vertical output lines V1 to V3. When, for example, the source voltage of the reset MOS M211 determined by the photo-signal charges of the photodiode D11 is higher than the gate voltage (voltage of the VRESL terminal 9) while signals on the first row are read out by this operation, the reset MOS M211 is OFF, and thus a voltage based on the signal voltage of the gate of an amplifier MOS M311 that is determined by the photo-signal charges of the photodiode D11 is read out.

If the source voltage of the reset MOS M211 determined by the photo-signal charges of the photodiode D11 falls to below the voltage subtracted Vth (threshold voltage of the reset MOS M211) from a gate voltage (voltage of the VRESL terminal 9), the reset MOS M211 is turned on to clip the gate voltage of the amplifier MOS M311. For this reason, the vertical output line V1 does not decrease below a voltage determined by subtracting the Vth from the voltage of the VRESL terminal 9 or less. This also applies to the remaining vertical output lines V2 and V3 in FIG. 7. The voltage of the VRESL terminal 9 is set such that the voltages of the vertical output lines V1 to V3 do not drop below a drain voltage for operating load MOSs M51 to M53 in the saturation range. As a result, the load MOSs M51 to M53 can be prevented from being turned off even in reading out very high signal charges. Thus, the sixth embodiment can obtain the same effects as those of the first embodiment.

Figure 8:
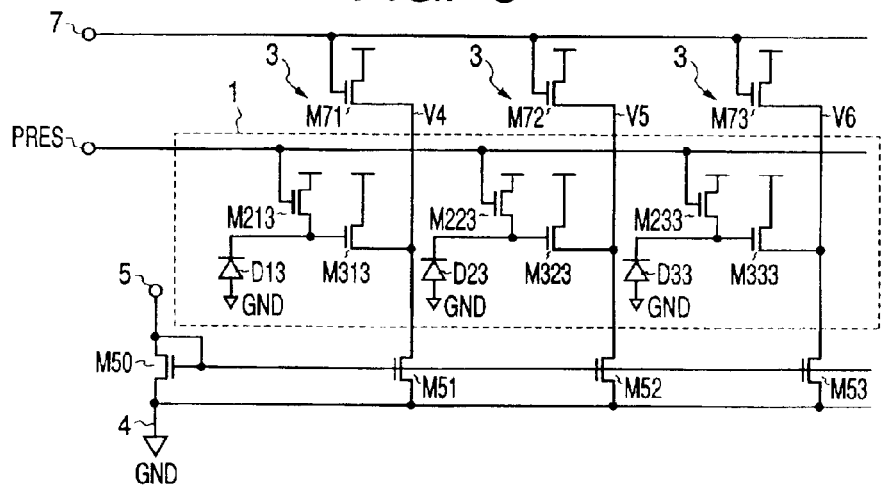
FIG. 8 is a block diagram showing the seventh embodiment of the present invention.

FIG. 8 is a block diagram showing a solid-state image pickup device according to the seventh embodiment of the present invention. In the seventh embodiment, a pixel portion 1 is constituted by a one-dimensional line sensor. Compared to the first embodiment, the pixel portion 1 does not use any selector MOS for selecting a row, and the drains of amplifier MOSs M313, M323, and M333 are directly connected to the power supply. Clipping elements 3 for clipping the outputs of the amplifier MOSs M313, M323, and M333 are respectively formed from only clipping MOSs M71, M72, and M73, the drains of which are directly connected to the power supply. When light is incident on photodiodes D13, D23, and D33, these photodiodes generate and accumulate photo-signal charges, and at the same time output them to output lines V4, V5, and V6 of the amplifier MOSs M313, M323, and M333. Then, PRES connected to the gates of reset MOSs M213, M223, and M233 changes to high level, and the charges accumulated in the photodiodes D13, D23, and D33 are reset.

With this operation, the sources of the amplifier MOS M313 and clipping MOS M71, those of the amplifier MOS M323 and clipping MOS M72, and those of the amplifier MOS M333 and clipping MOS M73 are commonly connected to form a differential arrangement. For example, when the gate voltage of the amplifier MOS M313 is much higher than the set clipping voltage of a power supply line 7, the clipping MOS M71 is OFF, and a signal voltage read out to the output line V4 is a voltage based on the signal voltage of the gate of the amplifier MOS M313. If the gate voltage of the amplifier MOS M313 comes close to the set clipping voltage, the clipping MOS M71 is turned on to activate clipping operation. When the gate voltage of the amplifier MOS M313 is much lower than the set clipping voltage, the vertical output line V4 does not decrease below a voltage determined by the set clipping voltage or less.

This also applies to the remaining output lines V5 and V6 shown in FIG. 8. The clipping voltage is set such that the voltages of the output lines V4 to V6 do not drop below a drain voltage for operating load MOSs M51 to M53 in the saturation range. This setting can prevent the load MOSs M51 to M53 from being turned off even in case of reading out very high signal charges. The voltage drop across a GND line 4 remains the same regardless of the number of pixels which receive strong light, so the set currents of the load MOSs M51 to M53 stay constant. In the seventh embodiment, the output voltages of dark pixels and OB pixels remain the same regardless of the number of pixels which receive strong light, and thus the circuit can be simplified without adopting any circuit for clamping OB on the output stage.

The eighth embodiment when the solid-state image pickup device described in any one of the first to seventh embodiments of the present invention is applied to a still camera (image pickup apparatus) will be described in detail with reference to FIG. 9.

In FIG. 9, a barrier 101 serves as both a lens protector and main switch. A lens 102 forms an optical image of an object on a solid-state image pickup device 104. An iris 103 varies the light quantity having passed through the lens 102. The solid-state image pickup device 104 captures the object image formed on the lens 102 as an image signal. An A/D converter 106 analog-to-digital-converts the image signal output from the solid-state image pickup device 104. A signal processing unit 107 executes various correction processes for the image data output from the A/D converter 106, or compresses data. A timing generation unit 108 outputs various timing signals to the solid-state image pickup device 104, an image pickup signal processing circuit 105, the A/D converter 106, and the signal processing unit 107. A system control and operation unit 109 controls various operations and the whole still camera. A memory unit 110 temporarily stores image data. An I/F unit 111 is used to record/read out data on/from a recording medium. Image data is recorded/read out on/from a detachable recording medium 112 such as a semiconductor memory. An I/F unit 113 is used to communicate with an external computer or the like.

The operation of the still camera in image pickup with the above arrangement will be explained.

When the barrier 101 is opened, the main power supply is turned on, the power supply of the control system is turned on, and the power supply of the image pickup system circuit including the A/D converter 106 is turned on.

To control the exposure amount, the system control and operation unit 109 sets the iris 103 to a full-aperture F-number. A signal output from the solid-state image pickup device 104 is converted by the A/D converter 106, and then input to the signal processing unit 107. The system control and operation unit 109 calculates the exposure amount on the basis of the data.

The brightness is determined from the results of photometry, and the system control and operation unit 109 controls the iris in accordance with the results.

A high-frequency component is extracted from the signal output from the solid-state image pickup device 104, and the system control and operation unit 109 calculates the distance to the object. The lens is driven to check whether the image is in focus or not. If the image is out of focus, the lens is driven again to measure the distance.

After an in-focus state is confirmed, actual exposure starts.

After exposure, an image signal output from the solid-state image pickup device 104 is A/D-converted by the A/D converter 106, and then written in the memory unit by the system control and operation unit 109 via the signal processing unit 107.

Data accumulated in the memory unit 110 are recorded on the detachable recording medium 112 such as a semiconductor memory via the recording medium control I/F unit under the control of the system control and operation unit 109.

Data may be directly input to a computer or the like via the external I/F unit 113 to process an image.

As described above, an output from an amplifier element for amplifying photo-signal charges from a photodiode is limited not to decrease below a predetermined voltage or less. This equalizes the output voltages of dark pixels and OB pixels between a row including a pixel which receives strong light and another row. An image which receives a strong light spot is free from any whitish band, and a clear image can be achieved. With the use of an image pickup apparatus according to the present invention, outputs from horizontal OB pixels do not change between a row including a pixel which receives strong light and another row, so the horizontal OBs need not be clamped. This can prevent any lateral stripe generated by variations in horizontal OB clamping level in units of rows, and a high-quality image pickup apparatus can be constructed with a simple block arrangement.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

a plurality of pixels, each of said pixels including a photoelectric conversion element adapted to perform photoelectric conversion and an amplifier element adapted to amplify and output a signal from said photoelectric conversion element;

a control element adapted to limit an output level of said amplifier element so that the output level is prevented from falling to below a predetermined level; and a load element adapted to serve as a load of said amplifier element, wherein said control element limits the output level so as not to turn off said load element.

2. An apparatus according to claim 1, wherein said load element includes a MOS transistor, and said control element limits the output level so as to operate the MOS transistor in a saturation range.

3. An image pickup apparatus comprising:

a plurality of pixels, each of said pixels including a photoelectric conversion element adapted to perform photoelectric conversion and an amplifier element adapted to amplify and output a signal from said photoelectric conversion element;

a control element adapted to limit an output level of said amplifier element so that the output level is prevented from falling to below a predetermined level;

wherein said pixel includes a reset element adapted to reset an input unit of said amplifier element, and said control element controls low level of a pulse for driving said reset element and limits the output level of said amplifier element so as to prevent the output level from falling to below the predetermined level.

4. An image pickup apparatus comprising:

a plurality of pixels, each of said pixels including a photoelectric conversion element adapted to perform photoelectric conversion and an amplifier element adapted to amplify and output a signal from said photoelectric conversion element;

a load element adapted to serve as a load of said amplifier element; and a control element adapted to control to prevent said load element from being turned off regardless of quantity of signal generated by said photoelectric conversion element.

5. An apparatus according to claim 4, wherein said control element includes a clipping element.

6. An apparatus according to claim 4, wherein said load element includes a MOS transistor, and said control element limits an output level so as to operate the MOS transistor in a saturation range.

7. An apparatus according to claim 4, wherein said control element limits an output level in accordance with a level of a signal generated by said photoelectric conversion element.

8. An apparatus according to claim 4, wherein said control element is arranged on an output line to which a signal from said amplifier element is output.

9. An apparatus according to claim 4, wherein said amplifier element and said control element constitute an input unit of a differential amplifier circuit.

10. An apparatus according to claim 4, wherein said pixel includes a reset element adapted to reset an input portion of said amplifier element, and said control element controls low level of a pulse for driving said reset element and limits an output level of said amplifier element so as to prevent the output level from falling to below a predetermined level.

11. An apparatus according to claim 4, wherein said pixel includes a selector element adapted to select said pixel, and said control element includes the same arrangement as said amplifier element and said selector element.

12. An apparatus according to claim 4, further comprising:

a lens adapted to form light into an image on said pixel;

an analog-to-digital conversion circuit adapted to convert a signal output from said pixel into a digital signal; and a signal processing circuit adapted to process the signal from said analog-to-digital conversion circuit.

* * * * *

UNITED STATES PATENT AND TRADEMARK OFFICE
CERTIFICATE OF CORRECTION

PATENT NO. : 6,963,371 B2
DATED : November 8, 2005
INVENTOR(S) : Sakurai et al.

It is certified that error appears in the above-identified patent and that said Letters Patent is hereby corrected as shown below:

<u>Title page,</u>
Item [57], ABSTRACT,
Line 12, "determined" should read -- predetermined --.

<u>Column 1,</u>
Line 21, "device includes" should read -- devices include --.

<u>Column 3,</u>
Line 12, "solid state" should read -- solid-state --.
Line 14, "embodiment" should read -- embodiments --.

<u>Column 4,</u>
Line 23, "photodiode" should read -- photodiodes --.
Line 48, "form" should read -- to form --.

Signed and Sealed this

Eighteenth Day of April, 2006

JON W. DUDAS
*Director of the United States Patent and Trademark Office*